(12) United States Patent
Endou

(10) Patent No.: US 7,303,480 B2
(45) Date of Patent: Dec. 4, 2007

(54) FLEXIBLE SHAFT COUPLING

(75) Inventor: Seiji Endou, Kanagawa (JP)

(73) Assignee: Miki Pulley Co., Ltd., Kanagawa (JP)

( * ) Notice: Subject to any disclaimer, the term of this patent is extended or adjusted under 35 U.S.C. 154(b) by 311 days.

(21) Appl. No.: 11/057,283

(22) Filed: Feb. 11, 2005

(65) Prior Publication Data

US 2005/0215328 A1   Sep. 29, 2005

(30) Foreign Application Priority Data

Mar. 25, 2004   (JP) ............................. 2004-088677

(51) Int. Cl.
*F16D 3/52* (2006.01)
(52) U.S. Cl. ....................................................... 464/78
(58) Field of Classification Search ................... 464/78; 267/181; 29/896.9
See application file for complete search history.

(56) References Cited

U.S. PATENT DOCUMENTS

| 3,473,202 | A | * | 10/1969 | Howard |
| 3,597,938 | A | * | 8/1971 | Hellen et al. ................. 464/78 |
| 5,324,235 | A | * | 6/1994 | Tomii et al. ............... 464/78 X |
| 6,203,437 | B1 | * | 3/2001 | Durie et al. ................. 464/78 |
| 6,268,645 | B1 | | 7/2001 | Takenaka et al. |
| 6,393,938 | B1 | | 5/2002 | Sahara et al. |

FOREIGN PATENT DOCUMENTS

| EP | 0349001 A2 | 6/1989 |
| JP | 45-19211 | 12/1965 |
| JP | 2012950 | 1/1990 |
| JP | 5-6226 | 1/1993 |
| JP | 6-78631 | 4/1993 |
| JP | 5288190 | 11/1993 |
| JP | 08-226456 | 9/1996 |
| JP | 10-047365 | 2/1998 |
| JP | 2000-46126 | 2/2000 |
| JP | 2004-60872 | 2/2000 |
| JP | 2000-97313 | 4/2000 |
| JP | 3382585 | 4/2000 |
| JP | 2000306958 | 11/2000 |
| JP | 2003294013 | 10/2003 |

OTHER PUBLICATIONS

Kandokoro Sekkei Gijutsu Jissenhen (Essential Design Techniques, May 29, 1998, pp. 38-39 Nikkei Business Publication.
Kikai Kogaku Gairon (General View of Mechanical Engineering), Feb. 1, 1984, pp. 67-68, Kabushiki Kaisha Gakkensha.

* cited by examiner

*Primary Examiner*—Greg Binda
(74) *Attorney, Agent, or Firm*—Marshall & Melhorn, LLC

(57) ABSTRACT

A flexible shaft coupling is comprised of a tubular hub made of a rigid material, wherein the hub is provided with a slit extending substantially circumferentially for providing flexibility to the hub, the hub having an axial bore so that a rotational force of a drive rotation shaft received in the axial bore at one end of the hub can be transmitted to a driven rotation shaft attached to the other end of the hub, wherein circumferential ends of a part of the hub adjoining the slit are each provided with a convex shape having an arcuately receding surface at least at an outer peripheral portion.

2 Claims, 6 Drawing Sheets

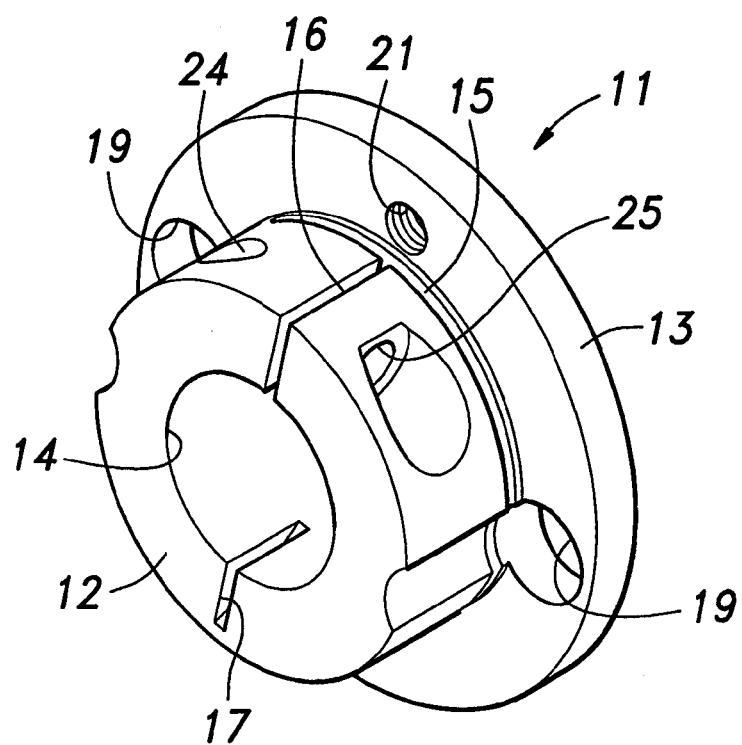
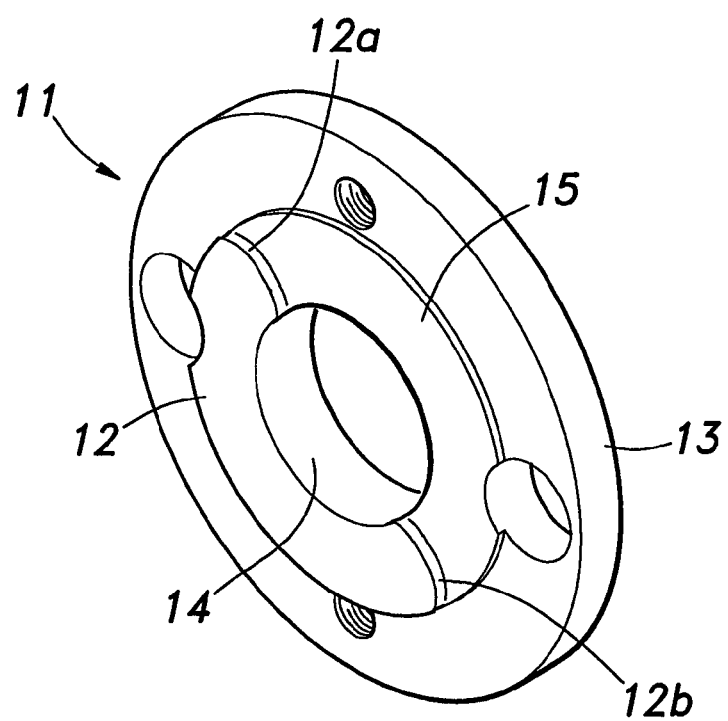

FLEXIBLE SHAFT COUPLING

TECHNICAL FIELD

The present invention relates to a flexible shaft coupling which is used to connect a drive rotation shaft and a driven rotation shaft to transmit power therebetween, and can flex to keep the connection when a misalignment, such as eccentricity, angular displacement or thrust displacement, is caused between the drive and driven rotation shafts. Particularly, the present invention relates to a flexible shaft coupling comprising a main body (hub) formed with one or a plurality of slits (grooves) for providing flexibility to the hub.

BACKGROUND OF THE INVENTION

Various flexible shaft couplings have been proposed in the past (see, for example, Japanese Utility Model Application Laid-Open No. 5-6226, Japanese Utility Model Application Laid-Open No. 6-78631, Japanese Patent Application Laid-Open No. 8-226456, Japanese Patent Application Laid-Open No. 10-47365 or Japanese Patent Registration No. 3382585). These flexible shaft couplings comprise a hub consisting of a tubular member, where the hub is formed with one or a plurality of slits for providing flexibility to the hub, to absorb misalignment of the shafts and maintain rotational force transmission between the shafts connected by the shaft coupling.

In the conventional flexible shaft couplings as disclosed in the above documents, the tubular hub may consist of a flange hub 1 constituted by a boss portion 2 and a flange portion 3 as shown in a perspective view of FIG. 1, where the boss portion 2 has an axial bore 5. Further, the boss portion 2 is formed with a slit 4 at a base portion thereof to provide flexibility to the hub 1. It should be noted that in FIG. 1, part of the boss portion 2 is cut away to show the shape of the slit 4. As seen, a part of the boss portion 2 circumferentially adjoining the slit 4 has two flat circumferential ends 2a, 2b, and an outer periphery of the slit 4 is aligned with an outer periphery of the boss portion 2 while an inner periphery of the slit 4 is aligned with an outer periphery of the axial bore 5.

When in use, a pair of such flange hubs 1, 1 are connected to each other by means of screws passed through attachment holes 6, 7 formed in the flange portion 3, and a drive shaft is inserted into the axial bore 5 of one of the flange hubs 1, 1 while a driven shaft is inserted into the axial bore 5 of the other so that the two shafts are connected to each other via the pair of flange hubs 1, 1. Preferably, a flat spring is interposed between the flange portions 3, 3 of the flange hubs 1, 1 (flat spring coupling) so that when a rotational force is transmitted between the shafts, the boss portion 2, which is provided with flexibility by the slit 4, as well as the flat spring can flexibly deform to absorb misalignment between the rotational axes of the two shafts.

However, in the flange hub 1 having the above-shaped slit 4, when it deforms to absorb the misalignment between the shafts such as eccentricity, angular displacement and/or thrust displacement which can be caused by rotational force application resulting from the power transmission between the shafts, a distribution of stress acting upon the boss portion 2 can be uneven as indicated by arrows 9 (9a, 9b) in FIG. 2. Specifically, the stress acting upon outer and inner peripheral portions of the boss portion 2 can be larger than that acting upon a portion around a central circumferential line 8, and particularly, the stress tends to have its peak at the outer peripheral portion of the boss portion 2, which may cause a crack in a part of the boss portion 2 near the outer periphery. This may prohibit favorable rotational force transmission, and in an extreme case, the flange hub may become unusable.

In order to solve such a problem, the above mentioned Japanese Patent Application Laid-Open No. 8-226456 has proposed to make the end (or bottom) of the slit rounded when seen in a direction perpendicular to the axis of the hub to whereby reduce stress which would otherwise tend to concentrate on the corners of the end of the slit, thus improving the strength against applied load and achieving higher reliability and durability. However, such a measure is not sufficient and further improvement is desired.

BRIEF SUMMARY OF THE INVENTION

In view of such problems of the prior art, a primary object of the present invention is to provide a flexible shaft coupling provided with a slit having an improved shape that can reduce or dissipate the concentration of stress and achieve more even stress distribution, to whereby avoid generation of cracking or any other damage to the shaft coupling and improve reliability and durability of the coupling.

A second object of the present invention is to provide such a flexible shaft coupling simple in structure and low in cost.

According to the present invention, such objects can be accomplished by providing a flexible shaft coupling (10, 30, 40), comprising: a tubular hub (11, 31, 41) made of a rigid material, wherein the hub is provided with a slit (15, 33, 43) extending substantially circumferentially for providing flexibility to the hub, the hub having an axial bore (14, 32, 42) so that a rotational force of a drive rotation shaft (22) received in the axial bore at one end of the hub can be transmitted to a driven rotation shaft (23) attached to the other end of the hub, wherein circumferential ends (12a, 12b, 31a, 31b) of a part of the hub adjoining the slit are each provided with a convex shape having an arcuately receding surface at least at an outer peripheral portion.

The convex circumferential ends of the part of the hub adjoining the slit may be provided with an arcuately receding surface at both of the inner and outer peripheral portions.

Because the stress imposed upon the circumferential ends of the hub upon load application tends to concentrate on the inner and outer peripheral portions of the circumferential ends and the stress tends to have its peak at the outer peripheral portion, the provision of the arcuately receding surface at least at the outer peripheral portion of the circumferential ends can reduce the amount of stress imposed thereupon. If the inner peripheral portion is also provided with an arcuately receding surface, a substantially uniform stress distribution can be achieved.

This can prevent the circumferential ends of the hub from undergoing a fatigue fracture that could result from the stress concentration upon load application, to thereby improve the reliability and durability of the shaft coupling. In addition/alternatively, the less concentrated stress distribution can allow a lower amount/quality of material to be used in the hub, to whereby achieve a more compact or lighter hub (or shaft coupling) at a lower cost.

Other and further objects, features and advantages of the invention will appear more fully from the following description.

BRIEF DESCRIPTION OF THE DRAWINGS

Now the present invention is described in the following with reference to the appended drawings, in which:

FIG. 3 is a perspective view showing a flange hub for a flexible shaft coupling according to the present invention;

FIG. 5 is a perspective view showing the flange hub of FIG. 3 with part thereof being cut away to illustrate the shape of circumferential ends of a part of the hub adjoining the slit for providing flexibility to the hub;

DETAILED DESCRIPTION OF THE PREFERRED EMBODIMENTS

Figure 1:
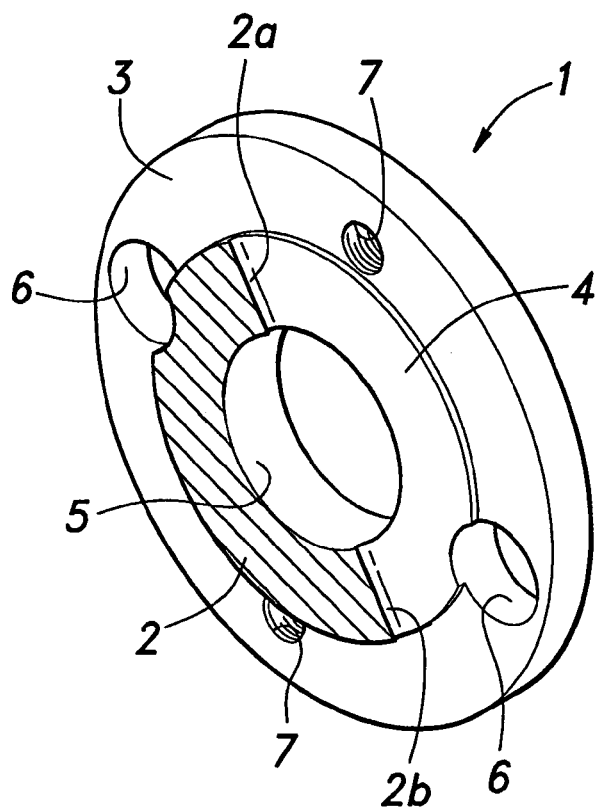
FIG. 1 is a perspective view showing a flange hub of a conventional flexible shaft coupling provided with a slit for providing flexibility to the hub, wherein part of the hub is cut away to illustrate the shape of circumferential ends of a part of the hub adjoining the slit.

FIG. 3 is a perspective view showing a flange hub 11 used as a main body of a flexible shaft coupling 10 according to one embodiment of the present invention. The flange hub 11 is of a tubular shape having a boss portion 12 and a flange portion 13 which is integrally provided at one axial end of the boss portion 12. The flange hub 11 is formed at its center with an axial bore 14 for fittingly receiving a shaft to be connected. The boss portion 12 is formed with a circumferential slit 15 that extends circumferentially or in a direction perpendicular to the axis of the hub 11 at a position near a border with the flange portion 13 (see FIG. 5). The boss portion 12 is further provided with an axial slit 16 and an inner groove or notch 17 which are located circumferentially opposite to each other and extend in the axial direction.

Figure 4:
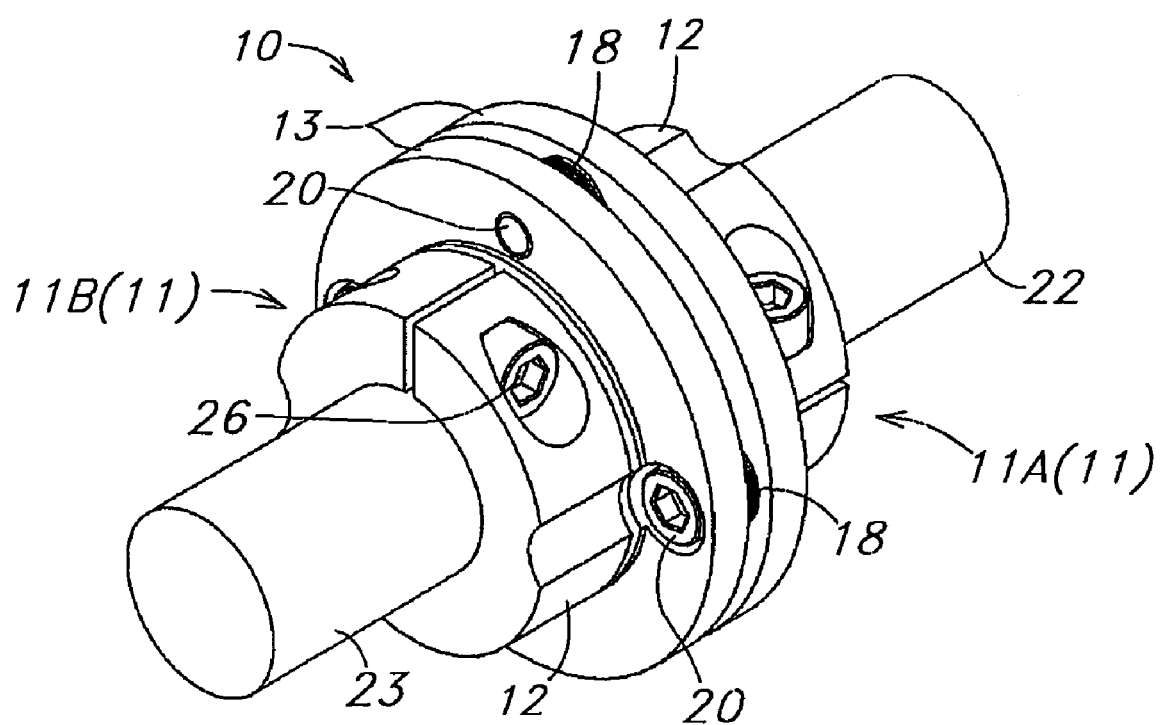
FIG. 4 is a perspective view showing the flexible shaft coupling in use where a pair of flange hubs as shown in FIG. 3 are used.

As shown in FIG. 4, the flexible shaft coupling 10 can be constituted by a pair of identical flange hubs 11 (11A, 11B) which are arranged such that their flange portions 13, 13 face each other, with a flat spring 18 being interposed therebetween. The flat spring 18 may comprise a plurality of stacked spring pieces. Connection screws 20 are passed through corresponding stepped holes 19 formed in one flange portion 13 and engaged with associated threaded holes 21 of the other flange portion 13 to fasten the flange hubs 11A, 11B to each other. A drive rotation shaft 22 and a driven rotation shaft 23 are inserted into respective axial bores 14 of the pair of flange hubs 11A, 11B and are secured therein by a connecting screw 26 engaged with a threaded stepped hole 24 via a stepped hole 25, which are formed to interpose the axial slit 16 therebetween.

Figure 2:
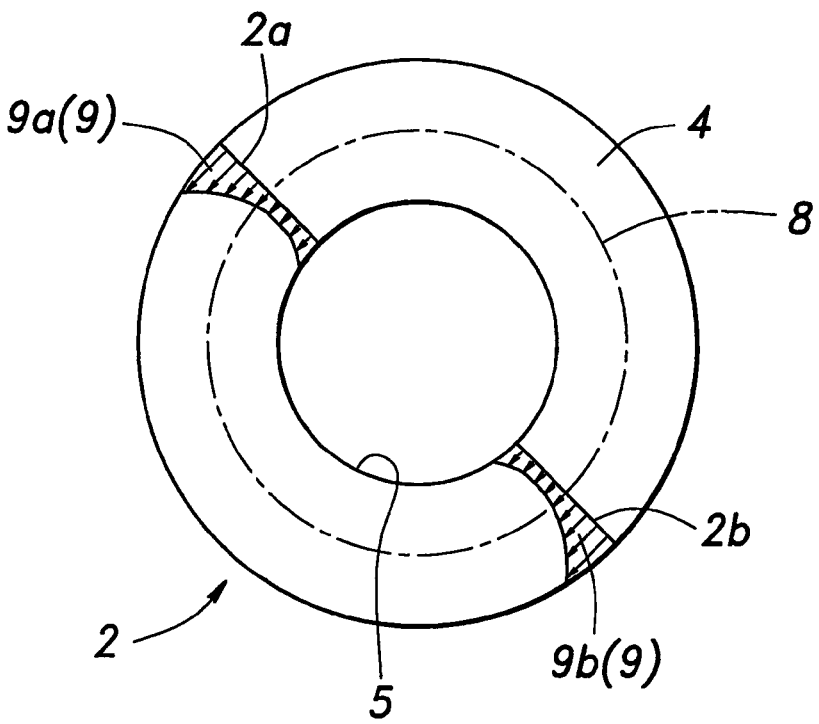
FIG. 2 is an end view of a boss portion of the hub of FIG. 1 and schematically shows a stress distribution at the circumferential ends of the part of the hub adjoining the slit.
Figure 6A:
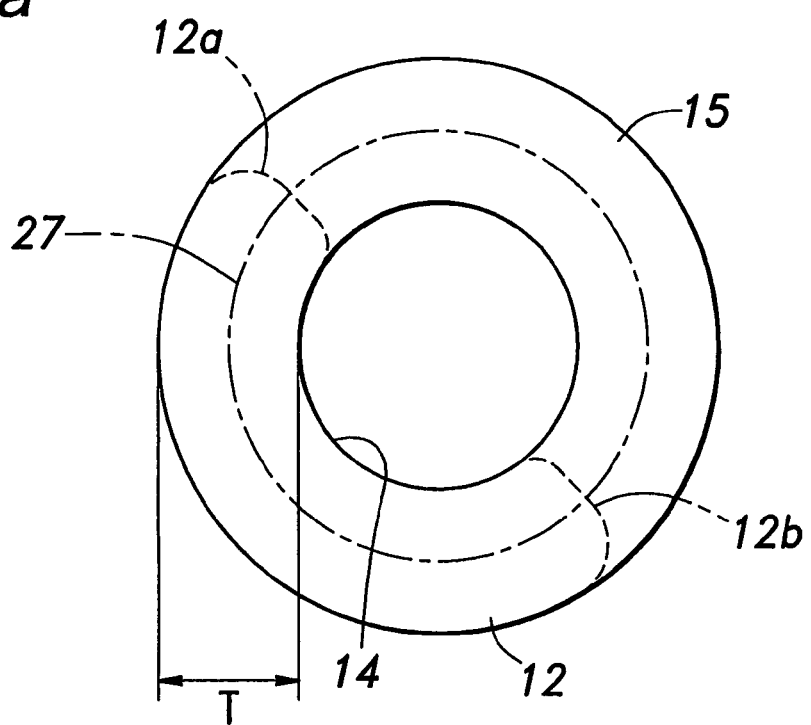
FIG. 6a is an end view of a boss portion of the hub shown in FIG. 3 and schematically shows the shape of the circumferential ends of the part of the of the hub adjoining the slit.
Figure 6B:
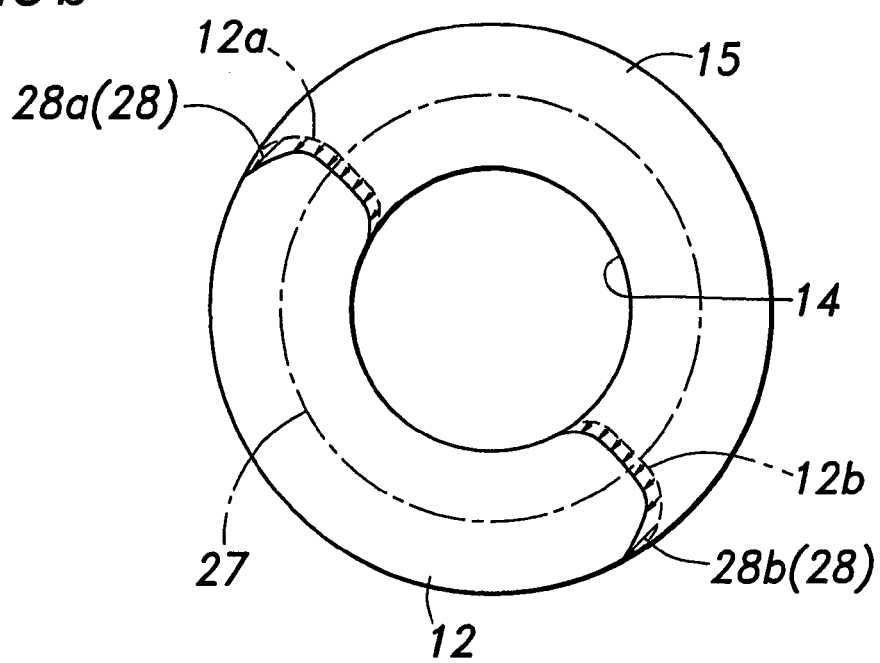
FIG. 6b is a view similar to FIG. 6a and shows a stress distribution at the circumferential ends of the part of the hub adjoining the slit.

As seen in FIGS. 5, 6a and 6b, the circumferential slit 15 is formed by removing about a circumferentially half of the material of a part of the boss portion 12 where the slit 15 is to be formed, and both circumferential ends 12a, 12b of the boss portion 12 adjoining the slit 15 are provided with a convex shape when seen in a direction along the axis of the hub 11, where the convex shape is determined based on the stress distribution shown in FIG. 2 to achieve a more uniform stress distribution. As best shown in FIG. 6a, the convex ends 12a, 12b comprises a substantially flat surface at around a central circumferential line 27 of the boss portion 12 and arcuately receding surfaces at inner and outer peripheral portions.

In this way, in contrast with the conventional embodiment where the stress is concentrated on inner and outer peripheral portions when a load is applied, the stress imposed upon the convex circumferential ends 12a, 12b of the boss portion 12 adjoining the slit 15 can be dispersed to reduce the amount of stress at the inner and outer peripheral portions of the circumferential ends 12a, 12b to achieve a substantially uniform stress distribution, as shown by the arrows 28 (28a, 28b) in FIG. 6b. This can prevent the circumferential ends 12a, 12b from undergoing a fatigue fracture that could result from the stress concentration, to thereby improve the reliability and durability of the shaft coupling. In addition/alternatively, the less concentrated stress distribution can allow a lower amount/quality of material to be used in the hub, to whereby achieve a more compact or lighter hub (or shaft coupling) at a lower cost.

In order to compare the above-described present invention flexible shaft coupling 10 with the conventional embodiment shown in FIGS. 1 and 2, a fatigue fracture test was conducted. The test showed that when a load 150% larger than a rated load is applied, the conventional shaft coupling fractured at about 3 million repeated applications of the load while the shaft coupling according to the present invention could properly function even after 10 million repeated applications of the load.

It should be noted that the stress distribution at the circumferential ends of the part of the boss portion adjoining the circumferential slit can vary depending on the overall structure or shape of the shaft coupling, and therefore, the shape of the receding surfaces of the convex circumferential ends need be determined appropriately in accordance with the particular stress distribution. In the shown embodiment, when the wall thickness of the boss portion 12 is represented by T (FIG. 6a), the receding surface at the outer peripheral portion can preferably consist of an arcuate surface having a dimension of T/2-T/3 while the receding surface at the inner peripheral portion can preferably consist of an arcuate surface having a dimension of T/3-T/4.

In the above embodiment, the convex ends 12a, 12b are provided with receding surfaces at both of the inner and outer peripheral portions. However, since less stress tends to concentrate on the inner peripheral portion than on the outer peripheral portion, the convex end may comprise a receding surface only at the outer peripheral portion and have the portion inward of the central circumferential line 27 constituted by a flat surface without a receding surface. This can be particularly preferable in a small flexible shaft coupling where it is difficult to form a receding surface at the inner peripheral portion.

Figure 7A:
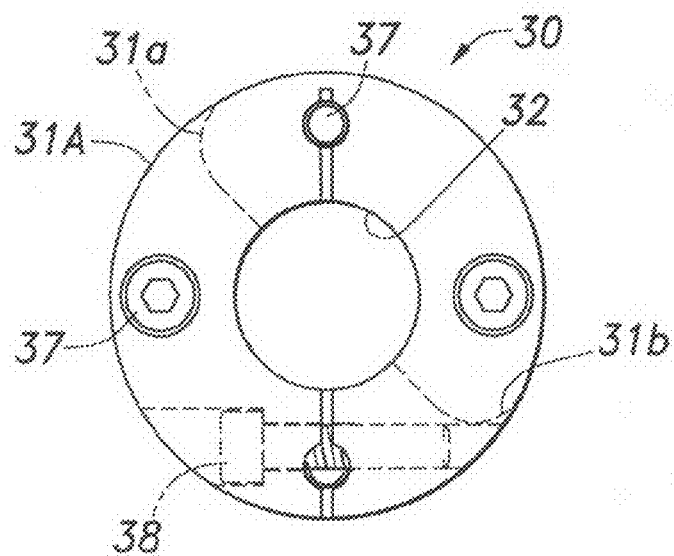
FIGS. 7a-7c are front, side and rear views showing another embodiment of a flexible shaft coupling according to the present invention.
Figure 7B:
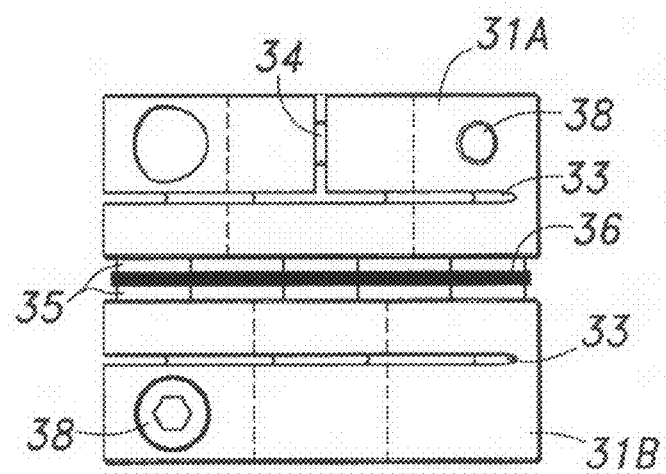
Figure 7C:
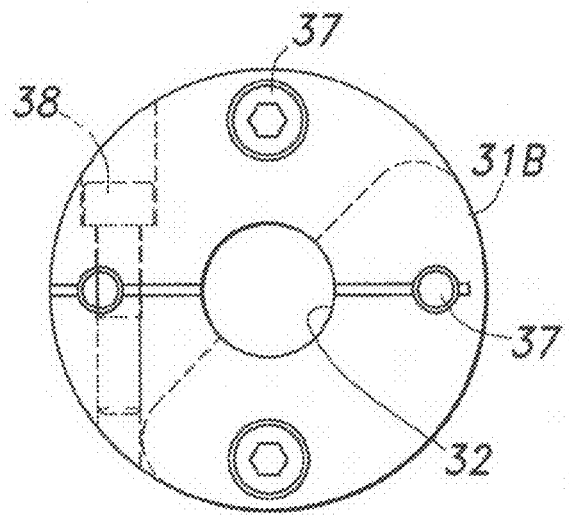

FIGS. 7a-7c show an embodiment of a flexible shaft coupling using a hub of a different shape according to the present invention. This shaft coupling 30 utilizes a hub (or coupling main body) 31 constituted by a straight tubular member without a flange portion, in which an axial bore 32 is formed along the center axis to receive a shaft to be connected. The hub 31 is formed with a circumferential slit 33 extending circumferentially in a semi-annular shape and an axial slit (or groove) 34 extending axially so as to be perpendicular to the circumferential slit 33.

The flexible shaft coupling 30 comprises a pair of such hubs 31 (31A, 31B) connected together by a connection screw 37 with a flat spring 36 being interposed therebetween. A drive rotation shaft and a driven rotation shaft are inserted into respective axial bores 32 and fastened therein by tightening connection screws 38. Thus, as in the previous embodiment, the slits 33 and the flat spring 36 contribute to providing flexibility to the shaft coupling 30 although it may be possible to omit the flat spring 36.

In this flexible shaft coupling 30, in order to prevent stress concentration on the inner and outer peripheral portions of the circumferential ends 31a, 31b of a part of the hub 31 circumferentially adjoining the slit 33, the circumferential ends 31a, 31b are provided with a convex shape having an arcuately receding surface, as in the previous embodiment. In this embodiment, however, the receding surface is formed only at the outer peripheral portion where the stress tends to have its peak value, although it may be possible to also provide a receding surface at the inner peripheral portion.

Figure 8:
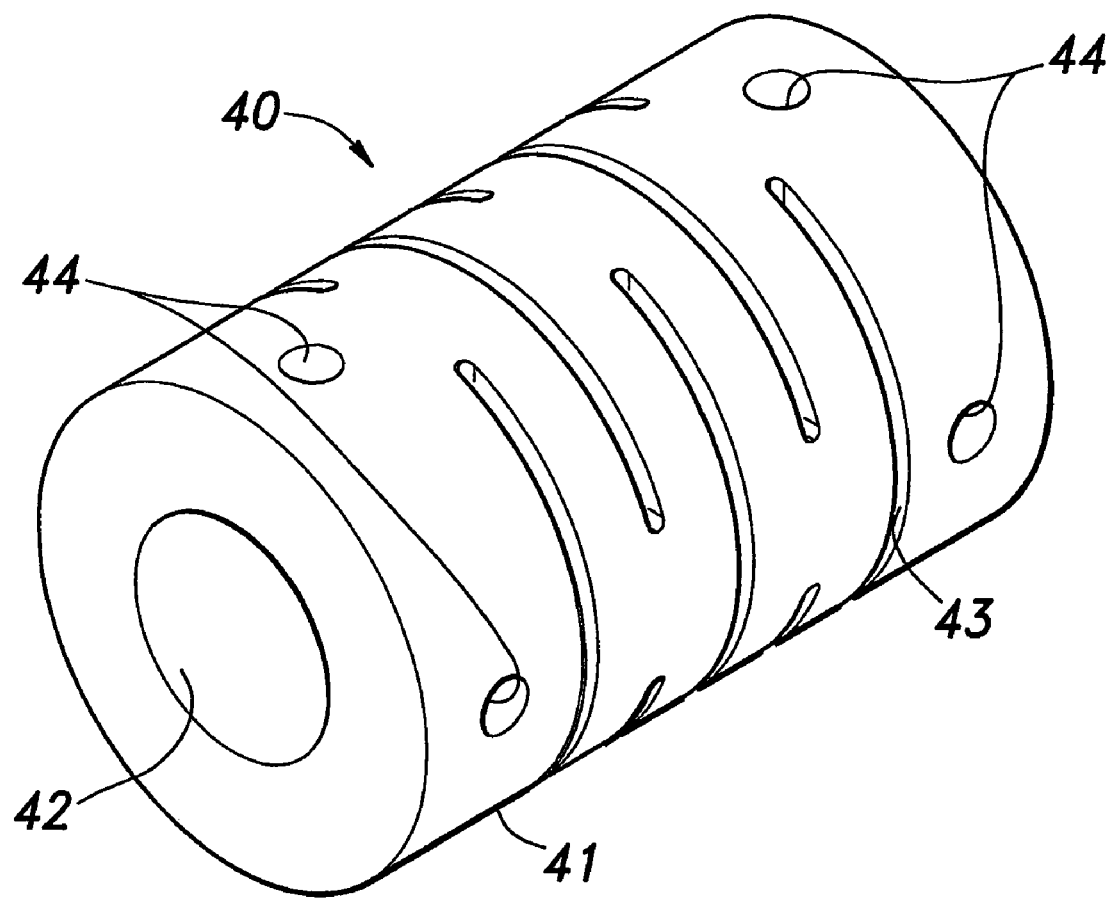
FIG. 8 is a perspective view showing yet another embodiment of a flexible shaft coupling according to the present invention.

FIG. 8 shows yet another embodiment of a flexible shaft coupling according to the present invention utilizing a hub having a different shape. This shaft coupling 40 comprises a hub 41 consisting of a straight tubular member with an axial bore 42 provided at its center. In this embodiment, the hub 41 is formed with a plurality of circumferentially extending slits 43 although the slits may be replaced with a single spiral slit or groove. The hub 41 is further formed with attachment holes 44 through which screws can be passed to fasten drive and driven shafts inserted into the axial bore 42.

In this flexible;shaft coupling, 40 also, like the above described embodiments, the circumferential ends of a part of the hub 41 adjoining the slit 43 can be of a convex shape having an arcuately receding surface in accordance with stress distribution such that the amount of stress imposed upon inner and outer peripheral portions (particularly upon the outer peripheral portion) is reduced to achieve a substantially uniform stress distribution.

The present invention can be applied to any other flexible shaft coupling besides those described above so long as the shaft coupling is formed with a slit for providing flexibility to achieve similar beneficial effects. Various alterations and modifications are possible without departing from the scope of the present invention.

For example, the hub may be made of various rigid material, which may comprise a metallic material such as aluminum or stainless steel as well as a resin such as polyimide or polyacetal. The shape of the hub may not be limited to the cylindrical shape as in the shown embodiments, but can be of a tubular member with the inner and/or outer peripheries having polygonal or oval shape. Further, although in the above embodiments the drive and driven shafts are both received in the axial bore of the respective hubs, the driven shaft may be integrally formed at an end of the hub or connected to the hub via a flange formed at the end of the hub.

Further, although in the illustrated embodiments the arcuately receding surfaces of the convex ends are formed by an arcuately curved surface, the receding surface may comprise a plurality of linear or flat surfaces that in combination form a quasi-arcuate surface, which can achieve similar effects as in the shown embodiments and thus should also fall within the scope of the present invention.

The invention claimed is:

1. A flexible shaft coupling comprising:
a tubular hub made of a rigid material, the hub having an axial bore so that a rotational force of a drive rotation shaft received in the axial bore at one end of the hub can be transmitted to a driven rotation shaft attached to the other end of the hub, wherein the hub is provided with a slit extending substantially circumferentially for providing flexibility to the hub,
and wherein circumferential ends of a part of the hub adjoining the slit are each provided with a convex shape when seen in a direction along the axis of the hub, the convex circumferential ends having an arcuately receding surface at least at an outer peripheral portion.

2. A flexible shaft coupling according to claim 1, wherein the circumferential ends of the part of the hub are each provided with a convex shape having an arcuately receding surface at both of inner and outer peripheral portions.

* * * * *